United States Patent [19]
Taniguchi et al.

[11] 3,981,815
[45] Sept. 21, 1976

[54] PROCESS FOR UTILIZING COLLECTED MATERIAL REMOVED FROM EFFLUENT GAS

[75] Inventors: Masao Taniguchi, Tokyo; Sueo Machi, Takasaki; Waichiro Kawakami, Takasaki; Shoji Hashimoto, Takasaki; Keita Kawamura, Yokohama; Shingi Aoki, Fujisawa, all of Japan

[73] Assignee: Ebara Manufacturing Co., Ltd., Tokyo, Japan

[22] Filed: Sept. 16, 1974

[21] Appl. No.: 506,571

[30] Foreign Application Priority Data
Sept. 21, 1973 Japan.............................. 48-106697
Sept. 21, 1973 Japan.............................. 48-106698
Sept. 21, 1973 Japan.............................. 48-106700
Sept. 21, 1973 Japan.............................. 48-106702
Sept. 21, 1973 Japan.............................. 48-106703

[52] U.S. Cl......................... 252/182; 204/157.1 R; 252/259.5; 423/235; 423/242
[51] Int. Cl.²...................... B01D 53/34; B01J 1/10
[58] Field of Search........................ 252/182, 259.5; 204/157.1 R, 157.1 H; 55/183; 423/235, 242

[56] References Cited
UNITED STATES PATENTS

| | | | |
|---|---|---|---|
| 3,389,971 | 6/1968 | Alliger | 204/157.1 R |
| 3,715,187 | 2/1973 | Bartholomew et al. | 423/242 |
| 3,867,509 | 2/1975 | Geiger et al. | 423/242 |
| 3,869,362 | 3/1975 | Machi et al. | 204/157.1 R |

*Primary Examiner*—Benjamin R. Padgett
*Assistant Examiner*—Irwin Gluck
*Attorney, Agent, or Firm*—Stevens, Davis, Miller & Mosher

[57] ABSTRACT

Effluent gas containing $SO_2$ and/or nitrogen oxides of various forms (referred to as $NO_x$) are irradiated with an ionizing radiation to form aerosol. The aerosol is collected by a collecting means to form a collected material containing sulfur dioxide and nitrogen oxides. Effective components are recovered from the collected material by subjecting it either to steam-roasting with or without addition of ore of low grade, solid waste generated from smelting processes, copper-containing pyrite cinders or an alkali earth metal compound to the collected material, or to thermal decomposition.

3 Claims, 7 Drawing Figures

DIFFERENTIAL THERMAL ANALYSIS AND THERMAL GRAVIMETRIC ANALYSIS OF WHITE MATERIAL

PROCESS FOR UTILIZING COLLECTED MATERIAL REMOVED FROM EFFLUENT GAS

BACKGROUND OF THE INVENTION

The present invention relates to utilization of effluent gas from various industrial processes and particularly to recovery of effective components from the effluent gas.

Today, a large amount of effluent gas is generated from various sources including various industrial plants, various combustion apparatuses, laboratories, engines of automobiles and the like. The whole amount of these effluent gas is released into the atmosphere every day, and causes air pollution. The effluent gas generally includes at least one noxious gas pollutant, such as sulfur dioxide or nitrogen oxides of various forms. Attempt have been made to remove the pollutants from the effluent gas before releasing them into the atmosphere. For example, Machi et al., U.S. Ser. No. 431,925 discloses a process for removing $SO_2$ and/or $NO_x$ from effluent gas which comprises irradiating the gas with an ionizing radiation to convert the $SO_2$ gas and/or $NO_x$ gas contained in the effluent gas to an aerosol, and collecting the aerosol containing sulfur dioxide and/or nitrogen oxides to obtain the collected material.

However, a process for further treating the collected material has not yet been discovered. Therefore, when such collected material is dumped, it causes water pollution.

It has been found that when collected material is heated or is subjected to steam-roasting with or without addition of a suitable additive thereto, either effective components contained in the collected material or materials which are readily convertible to effective components by post treatment can be recovered. The present invention is formed on the basis of this discovery.

Therefore, it is an object of this invention to provide a process for separating sulfur compounds and nitrogen compounds as main components from the collected material.

Another object of this invention is to provide a process for separating sulfur compounds and nitrogen compounds from the collected material which comprises blending an alkali earth metal compound with the collected material and then forming a paste of the mixture, and subjecting the paste to steam-roasting, and then subjecting the resulting steam-roasted product to thermal decomposition, thereby removing nitrogen dioxide from the product.

Still another object of this invention is to provide a process for recovering effective components from the collected material which comprises blending the collected material with an ore of low quality (ore which contains so small an amount of effective contents that it is not worth being smelted), solid waste generated from smelting processes, or copper-containing pyrite cinders, and forming a paste of the mixture, and subjecting the paste to steam-roasting.

Another object of this invention is to provide a process for recovering a mixed acid of sulphuric acid and nitric acid from the collected material which comprises forming a paste of the collected material, and subjecting the paste to steam-roasting.

DETAILED DESCRIPTION OF THE INVENTION

Figure 1:
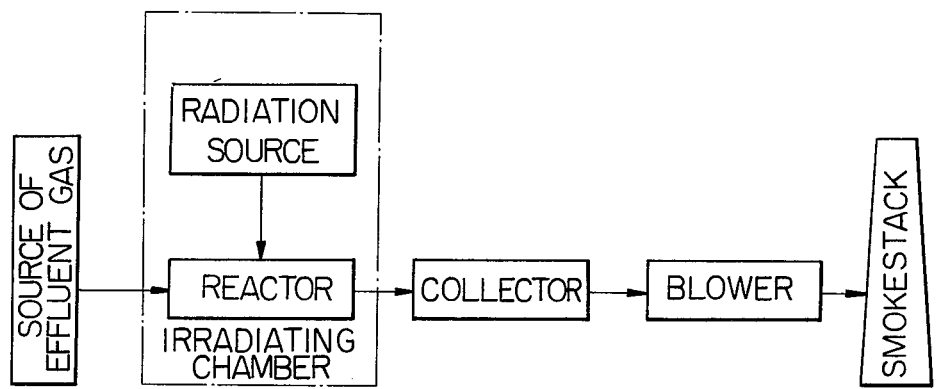
FIG. 1 is flow sheet showing one Example which treats effluent gas with an ionizing radiation.

Referring to FIG. 1, a process for removing sulfur compounds and/or nitrogen compounds from effluent gas is explained. Effluent gas containing $SO_2$ and/or $NO_x$ is irradiated with electron beams, whereby $SO_2$ and/or $NO_x$ are remarkably reduced in the reactor and an aerosol is formed therein. This aerosol is a mixture of solid material formed from $SO_2$, $NO_x$ and steam with sulfuric acid mist. The aerosol so formed is collected by a collecting means and is removed from the means as a collected material. As a result of our research, the collected material has been found to have the following properties.

a. The material has the following formula:

$$(NO_x)_l \cdot (SO_y)_m \cdot (H_2O)_n$$

b. The material is a white powder, and has low bulk density. A mixture of the material with a small amount of water reacts with stainless steel to form chrome sulfate and nickel sulfate. In other words the mixture is corrosive.

c. A water-soluble component is mainly sulfuric acid. The sulfuric acid contained in the collected material is one of the materials which give the collected material its absorbing property.

d. The reactivity of the collected material with an organic solvent, such as benzene, methanol or ethyl acetate is slow at a room temperature.

e. When the collected material is dipped in 1N sodium hydroxide solution, it is dissolved in the solution in several hours.

f. The collected material has no acidic property in the absence of water.

g. The collected material is a material similar to nitrosylsulfuric acid, and is reactive and has the properties of both sulfuric acid and nitric acid, and in other words the material has the reactivity, dissolving action and oxidizing action to a metal or a metal oxide.

By the "anhydrous material", we mean the material obtained by dehydrating the collected material. By the "ionizing radiation" we mean $\alpha$-rays, $\beta$-rays, $\delta$-rays, X-rays, accelerated electron beams and the like.

By the "nitrogen oxides" or "$NO_x$" we mean one or more compounds consisting of nitrogen and oxygen.

By the "sulfur oxides" or "$SO_y$" we mean one or more compounds consisting of sulfur and oxygen.

When the collected material is subjected to steam-roasting, the reaction equation is theoretically unclear. However, the following reaction seems to occur:

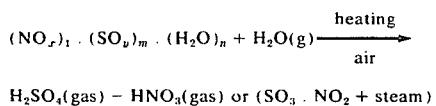

$$(NO_x)_l \cdot (SO_y)_m \cdot (H_2O)_n + H_2O(g) \xrightarrow[\text{air}]{\text{heating}}$$

$$H_2SO_4(gas) - HNO_3(gas) \text{ or } (SO_3 \cdot NO_2 + \text{steam})$$

When a material to be treated, such as an ore of low quality or waste generated from smelting processes is present in the reaction system, sulfate(s) and nitrate(s) seem to be formed.

The present invention relates to a process for carrying out various treatments by utilizing these properties of the collected material. This invention is characterized by recovering each of sulfuric acid and nitric acid independently or in the form of a mixture thereof as effective components from the collected material. This invention is also characterized by recovering effective components from waste generated from mining and smelting processes by treating the waste with the collected material and simultaneously recovering the effective components from the collected material.

First, a process for recovering effective components from the collected material by thermal treatment of the collected material is explained as follows.

Figure 2:
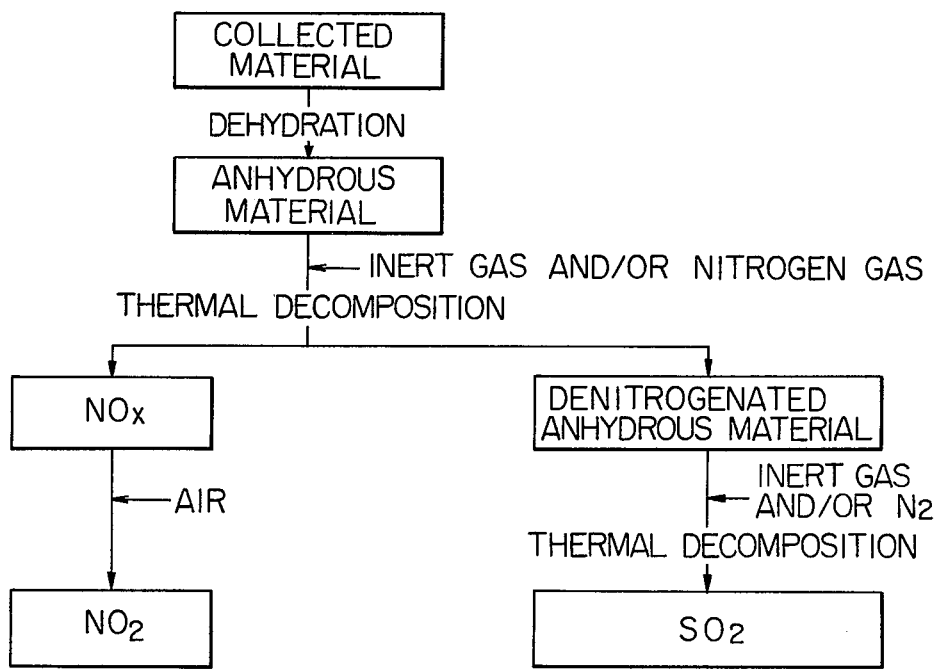
FIG. 2 is a flow sheet showing thermal treatment of the collected material.

In FIG. 2, the collected material is heated at a temperature of about 90°C to about 120°C to form an anhydrous material. Since the heating is carried out for removing water from the collected material, the heating temperature is not critical. The resulting anhydrous material is subjected to thermal decomposition in the presence of the gas selected from the group consisting an inert gas and nitrogen gas and in the absence of oxygen at a temperature of about 160°C to about 240°C, preferably about 160°C to about 200°C to separate gaseous nitrogen oxides of various forms from the solid anhydrous material. It is critical that the thermal decomposition is effected in the absence of oxygen. The reason is that the thermal decomposition has been found to be not effected in the presence of oxygen as a result of our extended research.

It is critical that the thermal decomposition of the anhydrous material is effected at a temperature of about 160°C to about 240°C. The rate of the decomposition is slow at a temperature of less than 160°C. Since sulfur dioxide is released at a temperature of more than 240°C, pure nitrogen oxides can not be obtained.

The resulting nitrogen oxides in the state of gas are heated in the presence of air at a temperature of not more than 140°C to form denitrogenated anhydrous material and nitrogen dioxide from which nitric acid is then produced. Such decomposition is not effected at a temperature of more than 140°C. In this case, since the amount of air contained in the decomposition system depends on the kind and the content of the lower nitrogen oxides contained in the nitrogen oxides, it is not critical.

The denitrogenated anhydrous material is subjected to thermal decomposition in the presence of an inert gas and/or nitrogen gas at a temperature of more than 240°C preferably of about 240°C to about 270°C to form sulfur dioxide from which sulfuric acid is then produced. In this case, the decomposition temperature is critical. The decomposition at a temperature of more than 270°C is not preferable from an economic point of view.

Figure 3:
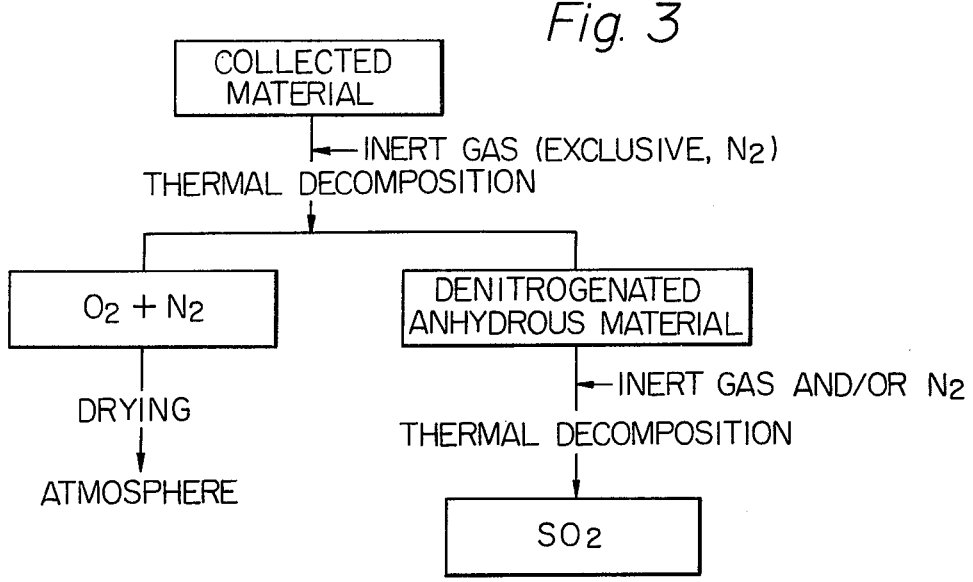
FIG. 3 is flow sheet showing another thermal treatment of the collected material.

Second, referring to FIG. 3, the collected material is subjected to thermal decomposition in the presence of an inert gas not including nitrogen gas at a temperature of about 165°C to about 240°C, preferably about 165°C to about 200°C without dehydration of the collected material, whereby denitrogenated material, $O_2$ and $N_2$ are formed. It is critical that the thermal decomposition is effected in the presence of an inert gas not including nitrogen gas, because the decomposition is not effected in the presence of nitrogen. In this case, the nitrogen component is released into the atmosphere as nitrogen gas which is not noxious. The denitrogenated material is subjected to thermal decomposition in the presence of an inert gas and/or nitrogen gas at a temperature of more than 240°C, preferably in the range of about 240°C to about 270°C to obtain sulfur dioxide.

Figure 7:
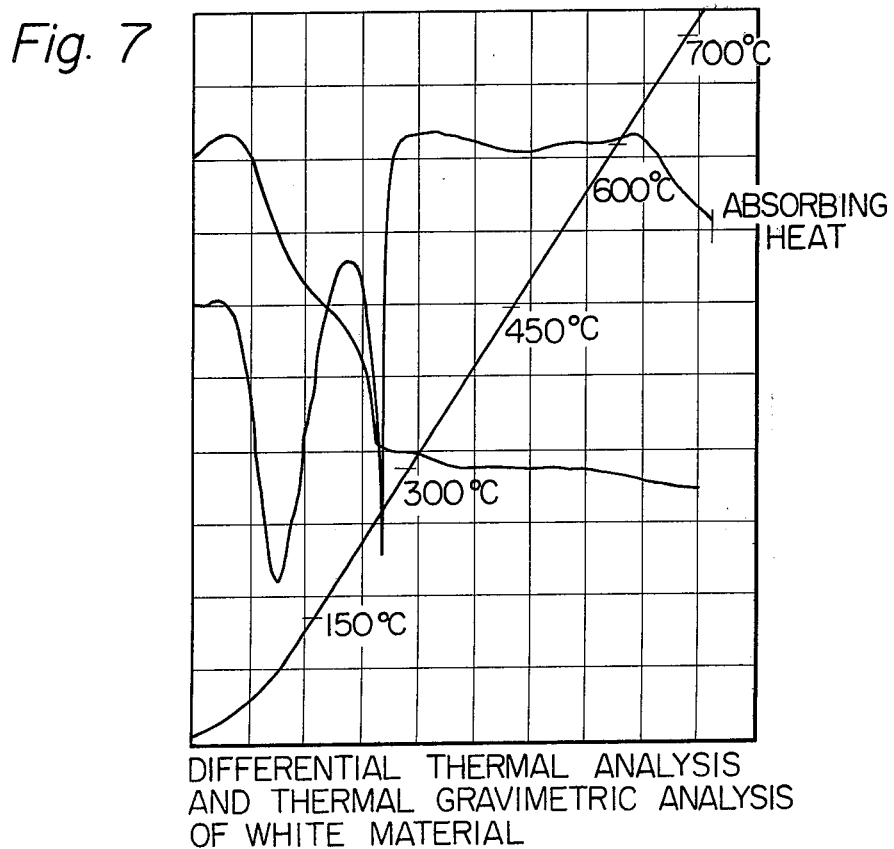
FIG. 7 is curves showing the results of differential thermal analysis and thermal gravimetric analysis on the white solid material obtained by irradiating the effluent gas with an ionizing radiation.

FIG. 7 is curves showing differential thermal analysis of the collected material. In the curves, a sharp absorbing zone is recognized to exist in the temperature range of 30° – 200°C (peak is 100°C) and in the temperature range of 220° – 270°C (peak is 250°C). Weight loss of the sample (collected material) occurs in the temperature range of 30° – 270°C. The first peak is caused from the release of steam. The white collected material is dehydrated to form the anhydrous material at a temperature at which the first peak appears. The second peak is caused from release of gas comprising nitrogen oxide gas and sulfur dioxide gas. The weight of the solid material is sharply reduced and becomes approximately zero. This phenomenon means that most of the collected material is converted to the gaseous material comprising $NO_x$ and $SO_y$.

Figure 4:
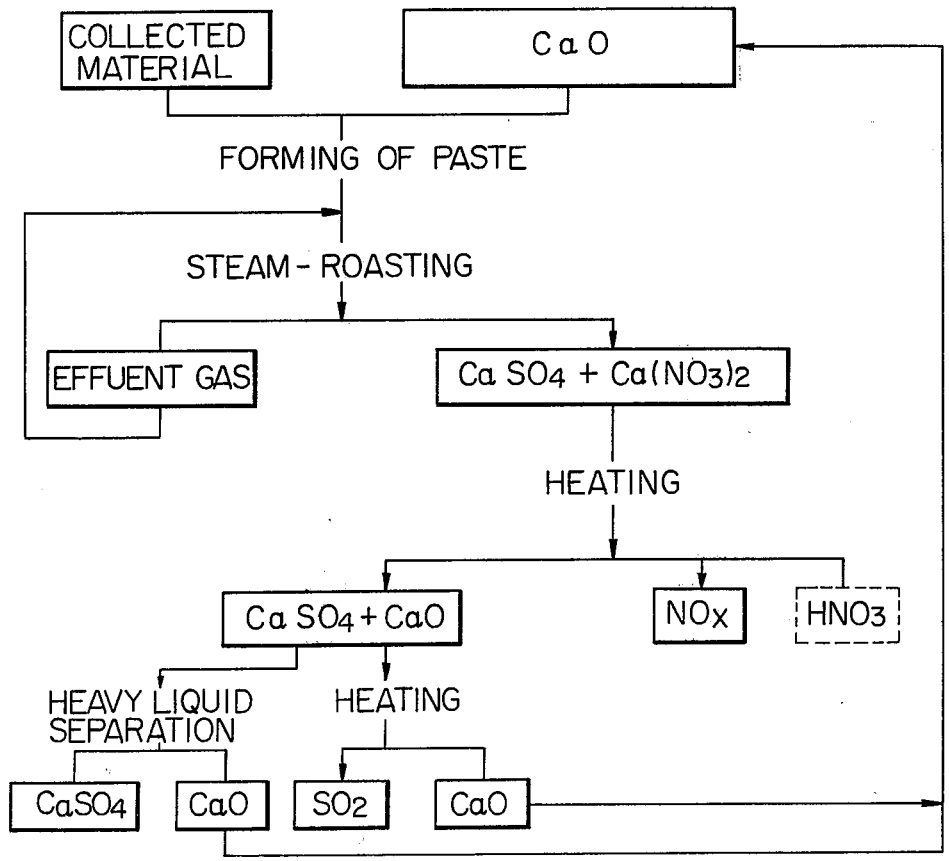
FIG. 4 is flow sheet showing treatment of the collected material with an alkali earth metal compound.

Third, a process for treating the collected material with an alkali earth metal compound, for example calcium oxide is explained by referring to FIG. 4.

The collected material is blended with calcium oxide, followed by forming a paste of the two components. Forming of the paste may be omitted. Since a blending ratio of the two components depends on the kind of components contained in the collected material and the ratio of the components, the blending ratio is not critical. The blended paste is subjected to steam-roasting at a temperature of about 250°C to about 500°C at a pressure of 0.1 – 1.0 atm. In this case, the temperature and the pressure depend on the kind of components contained in the paste and the ratio of the components. When effluent gas comprising $SO_2$ and $NO_x$ is generated through the steam-roasting process, it is recycled to the steam-roasting system. When calcium oxide is used as the alkali earth metal compound, the product obtained by the steam-roasting comprises calcium sulfate and calcium nitrate. When the product is subjected to thermal decomposition at a temperature of about 300°C to about 650°C, preferably, about 400°C to about 500°C, nitrogen oxides and optionally dilute $HNO_3$ are separated from the product. Nitrogen oxide generated as a by-product by the thermal decomposition process is oxidized at a temperature of less than 140°C to form nitrogen dioxide. The residue is a mixture of calcium sulfate and calcium oxide. Then the mixture is subjected to thermal decomposition at a temperature of more than 1300°C, thereby decomposing it to sulfur dioxide and calcium oxide. Alternatively, the mixture is subjected to heavy liquid separation to obtain calcium sulfate and calcium oxide separately. The thermal decomposition and the heavy liquid separation of the mixture are known to those skilled in the art.

The alkali earth metal compound which can be employed in this process includes a salt or an oxide of magnesium, calcium, strontium or barium. Particularly calcium oxide is preferred.

Effluent gas of about 100 million N m³.hr is generally generated in an electric power station. The effluent gas contains as high as about 1000 ppm of $SO_2$ and as high as about 400 ppm of $NO_x$. When the amount of $SO_2$ and $NO_x$ is calculated as weight/hr unit, the effluent gas generated per hour contains about 2.8 tons of sulfur dioxide and about 0.5 ton of nitrogen oxides. Recovery of $SO_2$ and $NO_x$ either according to the heating treatment of the effluent gas or to the treatment of the effluent gas with an alkali earth metal compound has important significance from an industrial point of view.

Figure 6:
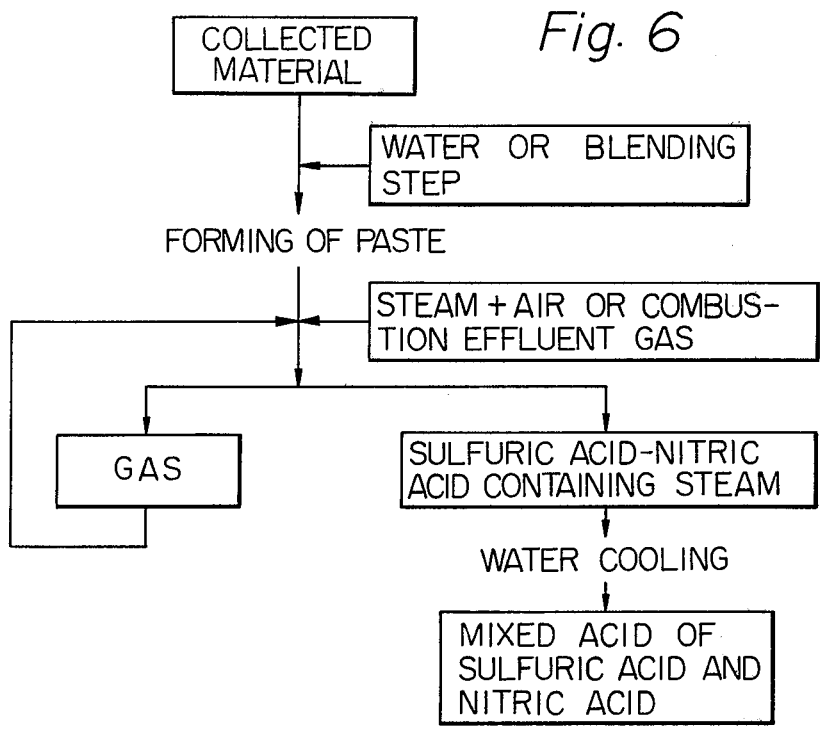
FIG. 6 is flow sheet showing steam-roasting of the collected material without addition of a material to be treated.

In FIG. 6, a process for forming a paste of the collected material, and then subjecting the paste to steam-roasting is explained.

A small amount of water is added to the collected material, followed by forming a paste of the mixture by blending it. The paste is subjected to steam-roasting at a temperature of about 150°C to about 300°C at a pressure of 0.1 ~ 1 atm, after steam and air are added to the paste. Sulfur dioxide, nitrogen oxides, and sulfuric acid and nitric acid in the vapor state are generated by the steam-roasting. The sulfur dioxide and nitrogen oxides in the vapor state are recycled to the steam-roasting process. The vapors of sulfuric acid and of nitric acid are condensed with water to recover mixed acid of sulfuric acid and nitric acid. In this case effluent gas generated from combustion may be added to the paste in place of steam and air.

The mixed acid of sulfuric acid and nitric acid can be used for acid treatment of an ore or for neutralizing alkaline effluent solutions. In addition, crude nitric acid and sulfuric acid can be produced from the mixed acid by means of concentration and distillation.

In the following process, effective components may be recovered from useless waste generated from mining and smelting processes by utilizing various properties of the collected material rather than effective components being recovered from the collected material.

Figure 5:
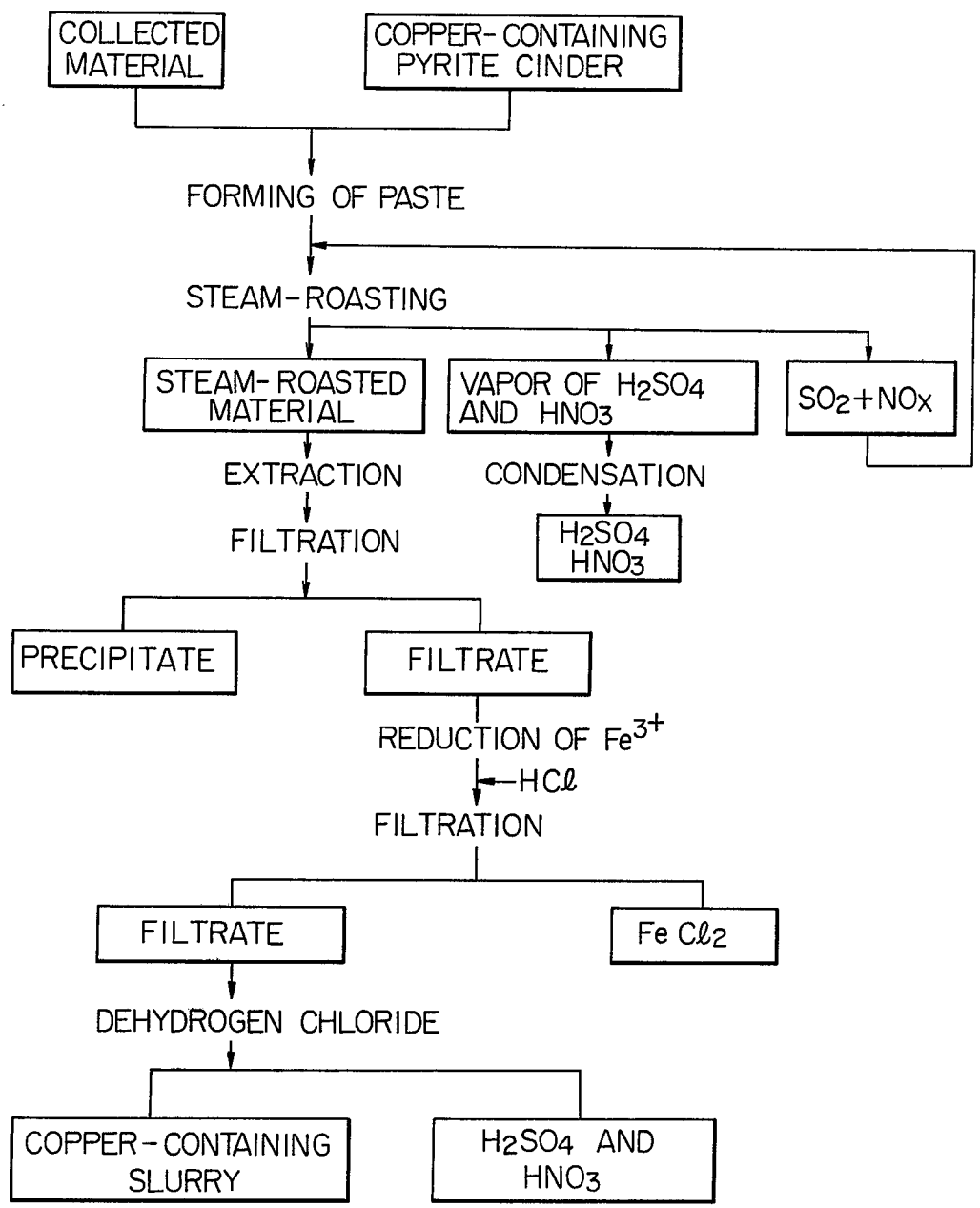
FIG. 5 is flow sheet showing treatment of the collected material with copper-containing pyrite cinders.

First, a process for treating the collected material with copper-containing pyrite cinders is explained by referring to FIG. 5.

The collected material is blended with copper-containing pyrite cinders and by forming a paste of the mixture. Forming the paste may be omitted. In this case 10 parts by weight of the material is preferably blended with 2 parts by weight of water. The cinder generally contains α-$Fe_2O_3$, $SiO_2$ and CuO (content of copper component is about 0.3%). The paste is subjected to steam-roasting at a temperature of about 250°C to about 500°C, preferably about 300°C to about 400°C at a pressure of about 0.1 to about 1.0 atm., whereby the steam-roasted product and the vapor of sulfuric acid and nitric acid are formed. The pressure is not critical. During the steam-roasting, sulfur compounds and nitrogen compounds contained in the collected material are neutralized by the cinder.

Most of neutralizing reactions are thought to be among the following.

  (1)

  (2)

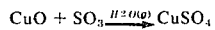  (3)

  (4)

The content of CuO in the cinders is considerably less than that of $Fe_2O_3$ therein and the reactions of (3) and (4) are more likely to take place than the reactions of (1) and (2). Therefore, CuO hardly remains in the steam-roasted material. When the amount of each one of $SO_2$ and $NO_x$ contained in the collected material is more than the amount of cations contained in the cinder with respect to the stoichiometric amount, effluent gas comprising vapor of sulfuric acid and nitric acid, $SO_2$ and $NO_x$ is generated from the steam-roasting process. The effluent gas is recycled to the steam-roasting system. The vapors of sulfuric acid and nitric acid generated from the steam-roasting process are condensed by water to form a mixed acid of sulfuric acid and nitric acid. The acid concentration in the mixed acid becomes diluted in comparison with the acid concentration in the collected material.

The steam-roasted product is extracted with water or hot water and is filtered, whereby undissolved copper-free iron oxide is separated as a precipitate from the filtrate. Iron scrap is added to the filtrate containing $Fe^{3+}$, $Cu^{2+}$, $SO_4^{2-}$ and $NO_3^-$ to reduce $Fe^{3+}$ in the filtrate to $Fe^{2+}$. Thereafter, hydrogen chloride gas is added to the filtrate to produce ferrous chloride as a precipitate. Taniguchi et al, Japanese Patent Publication Nos. 11503/1961, 23307/1961 and 23308/1961 disclose such processes for separating iron components from the filtrate. Then the mother liquid is heated at a temperature of about 40°C to about 60°C to concentrate it, whereby hydrogen chloride is removed from the mother liquid, and simultaneously copper components as a copper-containing slurry are removed from a mixed acid of sulfuric acid and nitric acid. The concentration of the mixed acid is in the ranges of 30–50 percent $H_2SO_4$ and 10–30 percent $HNO_3$. The use of the mixed acid is mentioned above.

The amount of steam added to the collected material in the steam-roasting process affects the amount of the mixed acid product. The less the amount of steam added to the collected material, the less the amount of the mixed acid obtained. It is preferable to lessen the amount of produced mixed acid by lessening the amount of added steam.

Sulfuric acid and nitric acid can separately be obtained from the resulting mixed acid by distilling a mixture thereof. The resulting sulfuric acid can be employed for acid treatment of an ore and for neutralizing alkaline effluent solutions. The copper-containing slurry can be employed as material resources for copper production.

In the above process, an ore of low quality or a solid waste generated from smelting processes may be employed in place of the pyrite cinders. In other words, the collected material is blended with a material selected from the group consisting of ore of low quality and solid waste generated from smelting processes, and subjecting the mixture at a suitable temperature at a suitable pressure to steam-roasting to form the steam-roasted product, and forming a paste of the mixture and recovering effective components from the steam-roasted product by extracting the product with water or hot water, followed by filtering the precipitate from the filtrate. Forming of the paste may be omitted. The ores of low quality or the wastes which can be employed in this process include serpentine ($3MgO.2SiO_2.2H_2O$, Ni = 0.2 percent), iron minerals containing nickel (content of nickel is less than 1 percent), and red mud generated from Bayer's process ($Fe_2O_3$ 62 percent). The treating conditions of this process, the kind of effective components recovered and the ratio of the components depend on the kind of the ore of low quality or the waste added.

These ores of low quality or wastes generated from smelting processes have not effectively been utilized as material resources up to now. Japan depends on foreign countries for most ore resources. Therefore, it is necessary to establish the utilization of such ore or such waste.

This invention relates to a process for recovering effective components from the ore or the waste by utilizing the properties of the collected material. Not only can air pollution by the effluent gas be avoided, but also effective utilization of resources is made possible according to the present invention.

One of the objects of this invention is to recover effective components from copper-containing pyrite cinders. A major reason why pyrite cinders have not been employed as ore resources for iron is that copper is contained in the cinder. Though the copper-containing pyrite cinder has not effectively been employed up to now, it can be utilized as a resource for iron according to this invention.

Similarly, since a process for effectively treating the ore of low quality and the waste generated from smelting processes has not been discovered, they have been dumped up to now. However, the ore or the waste can also be utilized effectively according to the present invention.

Furthermore, since the collected material has the foregoing properties (a) – (g) as mentioned above, it can also be used in the following processes.

1. Paste of the collected material is formed by blending it with a small amount of water. The paste has an acidic action being equal to that of industrial inorganic acid.

2. The paste obtained in (1) reacts with an alkaline material or a basic material to form a weakly acidic material having buffer action.

3. The collected material is placed in an aqueous alkaline or basic solution to dissolve it. The supernatant solution can be employed as a buffer solution without any modification. Alternatively, the supernatant solution is heat-concentrated to recover crude alkali sulfate or nitrate separately.

For example, when B-grade heavy oil is burned, the effluent gas generated by the combustion contains as high as about 100 ppm of $SO_2$ and as high as about 400 ppm of $NO_x$. When the amounts of $SO_2$ and $NO_x$ are calculated as g/m³ unit, the effluent gas contains about 2.8 gr/m³ of $SO_2$ and about 0.5 gr/m³ of $NO_x$. A common electric power station releases as high as about 100 million N m³/m of effluent gas. If the effluent gas is released into an atmosphere without treatment thereof, the combined amount of sulfur dioxide and nitrogen oxides of about 3.3 tons are released into the atmosphere. It is important that sulfur dioxide and nitrogen oxides contained in the effluent gas be irradiated with an ionizing radiation to remove them as aerosol from the gas. In addition, the effective utilization of the aerosol is industrially significant. The present invention satisfies these requirements.

The invention is further illustrated, but in no way limited, by the following Examples. In all cases unless otherwise noted, all parts and percentages are by weight.

EXAMPLE 1

B-grade heavy oil containing sulfur of 2.0 percent was burned, and the resulting effluent gas was introduced into the reacting chamber. The concentrations of $SO_2$ and $NO_x$ contained in the effluent gas are 600 ppm and 100 ppm, respectively. The amount of the effluent gas was 27 N m³/hr. The effluent gas containing $SO_2$ and $NO_x$ was irradiated with electron beams at a dose rate of about $10^5$ rad/sec at an energy of 2 MeV, using a Cockcroft-Walton type electron beam accelerator, whereby aerosol containing the $SO_2$ and $NO_x$ was formed in the reactor. The aerosol was collected by an electric precipitator. The precipitator comprises a cylinder having a length of 1 meter and a radius of 5.5 cm and core radius of 0.15 mm. The precipitator was imposed at a negative voltage of 15 KV. The temperature in the precipitator was 160°C.

The collected material was heated at a temperature of 100°C to form a dehydrate thereof. The resulting dehydrate was subjected to thermal decomposition at a temperature of 200°C to separate gasous nitrogen oxides from the dehydrate. The dehydrate was subjected to thermal decomposition at a temperature of 240°C to obtain sulfur dioxide gas free of nitrogen oxides having the ratio of $SO_2$:inert gas being 1:10.

A small amount of air was mixed with the nitrogen oxides. The mixed gas was heated at a temperature of 140°C to recover $NO_2$ in air ($NO_2$:air is 1:10).

EXAMPLE 2

The collected material obtained in Example 1 was subjected to thermal decomposition at a temperature of 165°C to form a mixed gas of $O_2$ and $N_2$, and denitrogenated material. The denitrogenated material was subjected to thermal decomposition in the presence of Ar at a temperature of 240°C, followed by drying the resulting gas to obtain highly concentrated $SO_2$ ($SO_2$:inert gas is 1:5).

EXAMPLE 3

The collected material obtained in Example 1 was blended with calcium oxide.

A paste of the mixture was formed. The paste was subjected to steam-roasting at a temperature of 400°C at a pressure of 1 atm to obtain a mixed salt of sulfate and nitrate as a steam-roasted product. In this case, the sulfate is $CaSO_4.XH_2O$ and the nitrate is $Ca(NO_3)_2.XH_2O$. The mixed salt was subjected to thermal decomposition at a temperature of 500°C, thereby obtaining $NO_x$ (main component is $NO_2$) and a mixture of calcium sulfate and calcium oxide separately. Nitrogen monoxide obtained as a by-product was converted to nitrogen dioxide by heating it at a temperature of less than 140°C. Pure dilute nitric acid free of sulfur was obtained by condensing the portion of vapor generated in the steam-roasting process.

EXAMPLE 4

The collected material obtained in Example 1 was mixed with copper-containing pyrite cinders (in the particle form of about 100 mesh) with a small amount of water, whereby a paste of the mixture was formed. The paste was subjected to steam-roasting at a temperature of 200°C at a pressure of 1 atm while supplying steam and air thereto. The vapor of sulfuric acid and nitric acid, and effluent gas containing $SO_2$ and $NO_x$ were generated as by-products from the steam-roasting process. The former was condensed by water to form a mixed acid of sulfuric acid and nitric acid. The latter was recycled to the roasting system. The resulting steam-roasted product was extracted with water and filtered, thereby removing undissolved copper-free iron oxide from the solution. The filtrate comprises $Fe^{3+}$, $Cu^{2+}$, $SO_4^{2-}$ and $NO_3^-$ as main components. Iron scrap was added to the filtrate to reduce ferric ion to ferrous ion. Then, hydrogen chloride gas was bubbled into the solution, whereby the solution was saturated by hydrogen chloride to precipitate ferrous chloride in order to remove iron components from the solution. The precipitate was filtered to obtain a mother solution liquid. The solution comprises $SO_4^{--}$, $NO_3^-$, $Cl^-$, and $Cu^{2+}$. The solution is heated at 50°C to distill hydrogen chloride, thereby separating copper-containing slurry from a mixed acid of sulfuric acid and nitric acid by post-filtration. The resulting ferrous chloride can be employed for preparing iron oxide powder for electric material.

EXAMPLE 5

This Example illustrates the preparation of a material having strong acidity.

To 100 parts of the collected material obtained in Example 1 was added 1 part of water.

The mixture was milled in an automatic mortar to prepare a paste similar to concentrated sulfuric acid having acidifying action. The time for forming the paste can be shortened by heating it. The paste must be prepared just before it is used, because it cannot be stored. Since the collected material can be stored in a dry state, it is treated when used.

The paste reacts with a metal or an oxide thereof to form a water-soluble metal sulfate. The heating promotes the reaction.

Particularly, since the paste exothermically and vigorously reacts with an alkaline material, it is preferable that the reaction is gradually carried out during cooling of the system. The material neutralized with alkaline material is weakly acidic or weakly basic.

What we claim is:

1. A process for recovering effective components from effluent gas containing sulfur dioxide and nitrogen oxides, which comprises irradiating the effluent gas with an ionizing radiation to form an aerosol, and then collecting the aerosol by a collecting means, and decomposing the resulting collected material, characterized by forming paste of the collected material, and subjecting the paste to steam-roasting to form a vapor of a mixed acid of sulfuric acid and nitric acid, and condensing the vapor by water to form a liquid of the mixed acid.

2. The process defined in claim 1, wherein the paste is subjected to steam-roasting at a temperature of about 150°C to about 300°C.

3. The process defined in claim 1, wherein steam-containing effluent gas generated from combustion is added to the steam-roasting system.

* * * * *